(12) United States Patent
Inard-Charvin et al.

(10) Patent No.: US 9,797,709 B2
(45) Date of Patent: Oct. 24, 2017

(54) METHOD FOR MEASURING THE THICKNESS OF A LAYER OF MATERIAL, GALVANIZING METHOD AND RELATED MEASURING DEVICE

(71) Applicant: ENOVASENSE, Villejuif (FR)

(72) Inventors: Jean Inard-Charvin, Paris (FR); Geoffrey Bruno, Paris (FR)

(73) Assignee: ENOVASENSE, Villejuif (FR)

( * ) Notice: Subject to any disclaimer, the term of this patent is extended or adjusted under 35 U.S.C. 154(b) by 0 days.

(21) Appl. No.: 14/902,217

(22) PCT Filed: Jun. 3, 2014

(86) PCT No.: PCT/FR2014/051308
§ 371 (c)(1),
(2) Date: Dec. 30, 2015

(87) PCT Pub. No.: WO2015/001210
PCT Pub. Date: Jan. 8, 2015

(65) Prior Publication Data
US 2016/0161247 A1    Jun. 9, 2016

(30) Foreign Application Priority Data
Jul. 1, 2013   (FR) ..................................... 13 56404

(51) Int. Cl.
*C23C 2/00*   (2006.01)
*G01B 11/06*  (2006.01)
(Continued)

(52) U.S. Cl.
CPC ............ *G01B 11/0658* (2013.01); *C23C 2/06* (2013.01); *C23C 2/14* (2013.01); *G01B 11/06* (2013.01); *G01B 21/085* (2013.01)

(58) Field of Classification Search
CPC .... G01B 11/0658; G01B 21/085; C23C 2/003
See application file for complete search history.

(56) References Cited

U.S. PATENT DOCUMENTS 3,043,956 A  *  7/1962  Cohen .................. G01N 21/314
                                                  250/350
4,513,384 A     4/1985  Rosencwaig
                   (Continued)

FOREIGN PATENT DOCUMENTS

| | | |
|---|---|---|
| EP | 0 097 473 | 1/1984 |
| EP | 0 233 120 | 8/1987 |
| FR | 2980846 | 4/2013 |

OTHER PUBLICATIONS

Melyukov et al., "Phase Lock-In Laser Active Pyrometry for Surface Layer Characterisation of Tokamaks Walls," 10th International Conference on Quantitative InfraRed Thermography, Jul. 27-30, 2010.
(Continued)

*Primary Examiner* — David Turocy
(74) *Attorney, Agent, or Firm* — Young & Thompson (57) ABSTRACT

Method of measuring the thickness of a layer by a light source irradiating the layer with a light beam, which light source is controlled by a sinusoidal control signal having a modulation frequency $f_m$ so that the light beam presents optical power that is sinusoidally modulated at the modulation frequency, the measurement method consisting in:
  using detector elements to determine a calibration phase shift ($\Delta\phi_{cal}$) between the optical power and the control signal;
  heating the layer with the light beam;
  using the detector elements to detect a sinusoidal component of a heat flux radiated by the layer;
  calculating a phase shift ($\Delta\phi_{th/opt}$) between the sinusoidal component of the radiated heat flux and the optical power of the light beam while taking account of the calibration phase shift; and
(Continued)

determining the thickness of the layer of material as a function of the phase shift ($\Delta\phi_{th/opt}$).

13 Claims, 3 Drawing Sheets

(51) Int. Cl.
*G01B 21/08* (2006.01)
*C23C 2/06* (2006.01)
*C23C 2/14* (2006.01)

(56) References Cited

U.S. PATENT DOCUMENTS

| | | | | |
|---|---|---|---|---|
| 4,875,175 | A * | 10/1989 | Egee | G01N 25/18 378/89 |
| 5,841,138 | A * | 11/1998 | Prekel | G01B 11/0658 250/341.1 |
| 2002/0031164 | A1 | 3/2002 | Scheidt et al. | |
| 2004/0241336 | A1 * | 12/2004 | Brisberger | C23C 2/14 427/431 |
| 2010/0208242 | A1 * | 8/2010 | Mart Nez | G01B 21/085 356/72 |
| 2014/0152841 | A1 * | 6/2014 | Rothenfusser | G01J 5/0003 348/164 |

OTHER PUBLICATIONS

Opsal et al., "Thermal-wave detection and thin-film thickness measurements with laser beam deflection," Applied Optics, vol. 22, No. 20, Oct. 15, 1983.

Wu et al., "Nondestructive Inspection of Turbine Blades with Lock-In Thermography," Materials Science Forum vols. 210-213, , 1996, pp. 289-294.

* cited by examiner

METHOD FOR MEASURING THE THICKNESS OF A LAYER OF MATERIAL, GALVANIZING METHOD AND RELATED MEASURING DEVICE

TECHNICAL FIELD TO WHICH THE INVENTION RELATES

The present invention relates in general manner to the field of metrology.

More particularly, the invention relates to a method of measuring a thickness of a layer of material by using emitter means for emitting a light beam in such a manner as to heat said layer of material.

The present invention finds a particularly advantageous application in a method of galvanizing a metal substrate, the method being used to determine the thickness of the layer of zinc deposited on the metal substrate.

The present invention also provides a measurement device for determining the thickness of a layer of material.

TECHNOLOGICAL BACKGROUND

Documents EP 0 233 120 and US 2002/031164 disclose methods of measuring the thickness of a layer of material by using light beam emitter means that emit a light beam so as to heat said layer of material.

The measurement methods described in those two above-mentioned documents present the disadvantage of enabling the thickness of the layer of material to be determined in relative manner only.

With methods of that type, it is necessary to have recourse to a reference sample having a layer of known thickness in order to measure the thickness of a layer of material on any sample.

In addition to being generally of low accuracy, such methods are often complex to perform.

Other methods enable the thickness of the layer of material to be measured in a manner that is absolute, in the sense that they do not require any reference sample.

Thus, the document "Photothermal radiometry for spatial mapping of spectral and materials properties" (Nordal and Kandstad, Scanned Image Microscopy, Academic Press London, 1980) discloses photothermal radiometry techniques for measuring the thickness of a layer of material.

Those photothermal radiometry techniques are based on measuring variations in the surface temperature of the layer of material by using an infrared detector that measures the heat flux radiated by the layer of material that is heated locally at a heating point by an intense light beam emitted by a powerful light source, e.g. a laser source.

The heat flux radiated by the layer of material is generally of low intensity and very noisy, such that the signal-to-noise ratio of the measurement is poor.

It is also known to use a synchronous detection method in which a light beam is used with optical power that is modulated sinusoidally at a known modulation frequency.

Modulating the optical power of the light beam leads to the temperature of the layer of material to be heated by the light beam emitted by that light source also being modulated.

The measurement signal that is delivered by the photothermal detector, which signal is representative of the heat flux radiated by the layer of material from the localized heating point, then also presents oscillations due to the temperature variations at the surface of the layer of material.

In a synchronous detection method, use is also made of a phase locked amplifier (or "lock-in amplifier") for performing analog filtering.

The amplifier accepts as input a signal that is not filtered, which signal is the product of said measurement signal delivered by the photothermal detector multiplied by an "optical" signal representative of the modulated optical power of the light beam, and at its output it delivers a signal representative of the phase shift between the sinusoidal component of the measurement signal at the modulation frequency of the light beam and the optical signal. By way of example, such an amplifier is used in Document U.S. Pat. No. 4,513,384.

It is then possible to calculate the thickness of the layer of material from the value of this phase shift (see for example "Thermal-wave detection and thin-film thickness measurements with laser beam deflection", Applied Optics, Vol. 22, No. 20, pp. 3169-3176, Oct. 15, 1983), and from a set of thermo-physical characteristics of the layer of material, for example its conductivity and its thermal diffusivity, its optical absorption coefficient for the light beam, or indeed its thermal resistance.

Nevertheless, the use of synchronous detection with a phase-locked amplifier requires measurements to be performed over a measurement time that is long in order to average out the non-filtered signal so as to improve the signal-to-noise ratio.

Also known is document "Phase lock-in laser active pyrometry for surface layer characterization of tokamaks walls" (Melyukov et al., $10^{th}$ International Conference on Quantitative Infrared Thermography, Jul. 27-30, 2010, Quebec), which discloses a method of measuring the thickness of a layer of material, by:

measuring the modulated optical power by means of a photodiode;

measuring the radiated heat flux by means of a pyrometer; and acting in real time, by means of synchronous detection and a phase locked amplifier, to determine the phase shift between the measurement signal and the optical signal on the basis of the two preceding measurements.

Such a measurement method, which makes use of two distinct detectors, is unfortunately of poor accuracy for determining the phase shift between the sinusoidal component of the radiated heat flux and the modulated optical power.

Furthermore, the measurement times of such a method are long.

Finally, it is poorly adapted to making measurements while "hot" on a layer of material radiating a large amount of heat flux that would run the risk of damaging the laser and the detector, e.g. a layer of material presenting a temperature that is greater than or equal to 150 degrees Celsius (° C.).

OBJECT OF THE INVENTION

In order to remedy the above-specified drawbacks of the prior art, the present invention proposes a method of measuring thickness that is simultaneously accurate, fast, and suitable for performing a thickness measurement while "hot", when the temperature of the layer of material is high.

More particularly, the invention provides a method of measuring the thickness of a layer of a material by using emitter means for emitting a light beam, the emitter means being electrically controlled by a sinusoidal control signal having a modulation frequency $f_m$ and a control phase $\phi_{com}$, such that said light beam presents optical power that is sinusoidally modulated at said modulation frequency $f_m$, said measurement method comprising:

a calibration step for calibrating said emitter means that consists in using photothermal detector means to determine a calibration phase shift $\Delta\phi_{cal}$ between said modulated optical power and said control signal for said modulation frequency $f_m$;

a heating step for heating said layer of material by irradiating said layer of material with said light beam;

a detection step for detecting a sinusoidal component of a heat flux radiated by said heated layer, by using said photothermal detector means;

a calculation step for calculating, for said modulation frequency $f_m$ of the control signal, a phase shift $\Delta\phi_{th/opt}$ between said sinusoidal component of the radiated heat flux and said modulated optical power of the light beam, while taking account of said calibration phase shift $\Delta\phi_{cal}$ as previously determined during the calibration step; and a determination step for determining the thickness of said layer of material as a function of said calculated phase shift $\Delta\phi_{th/opt}$ between said sinusoidal component of the radiated heat flux and said modulated optical power of the light beam.

Thus, by means of the invention, it is possible to determine the thickness of the layer of material accurately and quickly.

Because of the prior calibration step performed using the same photothermal detector means as are used during the detection step, the phase shift between the modulated optical power of the light beam and the control signal controlling the means for emitting the light beam is calibrated, thereby improving the accuracy with which the phase shift is determined between the sinusoidal component of the radiated heat flux and the modulated optical power.

The accuracy and the speed of subsequent measurements of the thickness of the layer of material are thus improved.

This improvement in the accuracy and the speed with which thickness is determined makes it possible to perform measurement while "hot" in entirely safe manner and with accuracy that is comparable to the accuracy of already existing "cold" measurement methods.

Unfortunately, such "cold" methods require waiting for the temperature of the layer to return to a temperature that is less than or equal to 50° C. before it is possible to measure the thickness of the layer.

In a particular implementation of the measurement method of the invention:

during the detection step, said photothermal means deliver a measurement signal that is representative of said radiated heat flux;

a digital filtering step is provided, after said detection step and before said calculation step, in which said measurement signal is filtered in order to:

extract a sinusoidal component from said measurement signal that is modulated at said modulation frequency $f_m$ of the control signal; and determine a measurement phase $\phi_{mes}$ of said sinusoidal component of said measurement signal; and during the calculation step, said phase shift $\Delta\phi_{th/opt}$ between said sinusoidal component of the radiated heat flux and said modulated optical power of the light beam is calculated for said modulation frequency $f_m$ of the control signal, from:

a measurement phase shift $\Delta\phi_{mes}$ between said sinusoidal component of the measurement signal and said control signal, i.e.

$$\Delta\phi_{mes} = \phi_{mes} - \phi_{com}$$

the calibration phase shift $\Delta\phi_{cal}$, as previously determined during said calibration step.

Thus, the measurement method of the invention makes it possible to obtain a good signal-to-noise ratio without using synchronous detection.

Digital filtering is performed on the measurement signal in this example, thus enabling measurements to be performed quickly.

Other characteristics of the measurement method in accordance with the invention that are non-limiting and advantageous are as follows:

the steps prior to said calculation step are repeated for another modulation frequency $f'_m$ of the control signal that is different from said previously used modulation frequency $f_m$; during the calculation step, another phase shift $\Delta\phi'_{th/opt}$ between said sinusoidal component at said other modulation frequency $f'_m$ of the radiated heat flux and said modulated optical power of the light beam at said other modulation frequency $f'_m$ is also calculated, for said other modulation frequency $f'_m$; and during the determination step the thickness of said layer of material is determined also as a function of said other calculated phase shift $\Delta\phi'_{th/opt}$;

said heating and detection steps that are repeated for said other modulation frequency $f'_m$ of the control signal are executed in parallel with executing steps subsequent to said detection step for said modulation frequency $f_m$ of the control signal; and during the determination step: adjustment parameters are used to match a curve representative of a theoretical phase shift $\Delta\phi_{th/opt,theo}$ between said sinusoidal component of said radiated heat flux and said modulated optical power of the light beam as a function of the modulation frequency $f_m$ of the control signal, while taking account of the phase shift $\Delta\phi_{th/opt}$, $\Delta\phi'_{th/opt}$ as calculated for different modulation frequencies $f_m$ and $f'_m$; and the thickness of said layer of material is determined as being one of said adjustment parameters for the matched representative curve.

A particularly advantageous application of the invention lies in using a measurement method in accordance with the invention for measuring the thickness of a layer of zinc deposited on a metal substrate, e.g. during a galvanizing method.

Thus, the invention also provides a galvanizing method for galvanizing a metal substrate, the method comprising the following successive steps:

preparing a deposition surface of said metal substrate;

immersing said metal substrate in a bath of molten zinc;

extracting said metal substrate from the bath of molten zinc, said deposition surface of the metal substrate being covered in a layer of zinc; and determining the thickness of said layer of zinc deposited on said metal substrate by using a measurement method in accordance with the invention.

Other characteristics of the galvanizing method in accordance with the invention that are non-limiting and advantageous are as follows:

the thickness of said layer of zinc is determined on exiting the bath, while said layer of zinc presents a temperature lying in the range 150° C. to 480° C.;

the thickness of said layer of zinc as measured on exiting the bath is compared with a desired threshold thickness, and when said measured thickness is less than said threshold thickness, said metal substrate is re-immersed in the bath of molten zinc, so as to add an additional layer of zinc on said layer of zinc; and for galvanizing a series of metal substrates, the deposition parameters for depositing the layer of zinc on one of said substrates of the series are adapted as a function of the thickness of the layer of zinc on at least one of the previously galvanized substrates, as measured on exiting the bath.

Finally, the invention also provides a measurement device for determining the thickness of a layer of material, the device comprising:

electrical control means adapted to deliver a sinusoidal control signal having a modulation frequency $f_m$ and a control phase $\phi_{com}$;

emitter means for emitting a light beam, the emitter means being electrically controlled by said electrical control means so as to emit a light beam that presents optical power that is sinusoidally modulated at said modulation frequency $f_m$ of the control signal;

photothermal detector means adapted to detect a heat flux radiated by said layer of material heated by said light beam and delivering a measurement signal that is representative of said heat flux radiated by said layer of material;

digital filter means adapted to extract from said measurement signal a sinusoidal component modulated at said modulation frequency $f_m$ of the control signal in order to determine a measurement phase $\phi_{mes}$ of said sinusoidal component of the measurement signal; and calculation means adapted both to calculate, for said modulation frequency $f_m$ of the control signal, a phase shift $\Delta\phi_{th/opt}$ between a sinusoidal component of the radiated heat flux and said modulated optical power of the light beam, from:

a measurement phase shift $\Delta\phi_{mes}$ between said sinusoidal component of the measurement signal as delivered by the photothermal detector means and said control signal, i.e.

$$\Delta\phi_{mes}=\phi_{mes}-\phi_{com}$$

a calibration phase shift $\Delta\phi_{cal}$, determined using the photothermal detector means, between said modulated optical power of the light beam and said control signal; and also to determine the thickness of said layer of material as a function of the phase shift $\Delta\phi_{th/opt}$ between said sinusoidal component of said radiated heat flux and said modulated optical power of the light beam.

Other characteristics of the measurement device in accordance with the invention that are non-limiting and advantageous are as follows:

the emitter means for emitting a light beam comprise a laser diode or a laser, and the electrical control means comprise a current generator;

the measurement device further includes a remote measurement head connected to said emitter means for emitting a light beam by means of a bundle of optical fibers, said remote measurement head being adapted to collect said radiated heat flux; and the photothermal detector means comprise a photothermal detector placed in said remote measurement head, said photothermal detector collecting said radiated heat flux in order to transmit it by means of said bundle of optical fibers.

DETAILED DESCRIPTION OF AN EMBODIMENT

The following description given with reference to the accompanying drawings showing non-limiting examples shows clearly what the invention consists in and how it can be reduced to practice.

In the accompanying drawings.

As a preliminary point, it should be observed that elements that are identical or similar in the various embodiments shown in different figures are referenced using the same reference symbols and are not described on each occasion.

Figure 1:
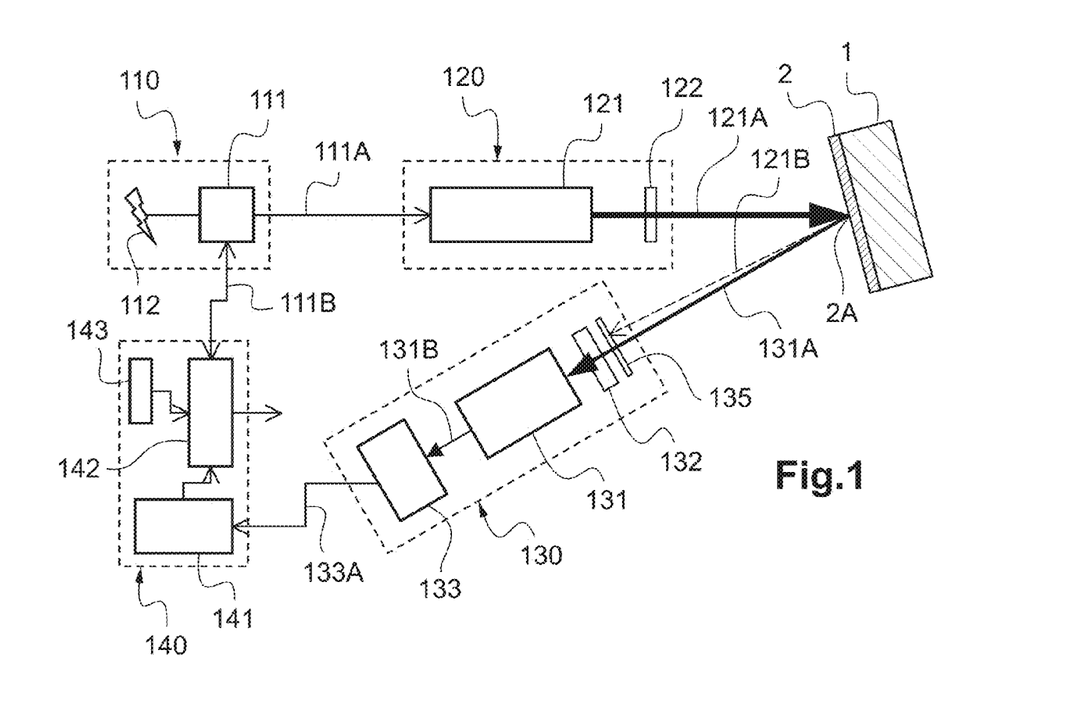
FIG. 1 is a diagrammatic view of a measurement device in a first embodiment.
Figure 2:
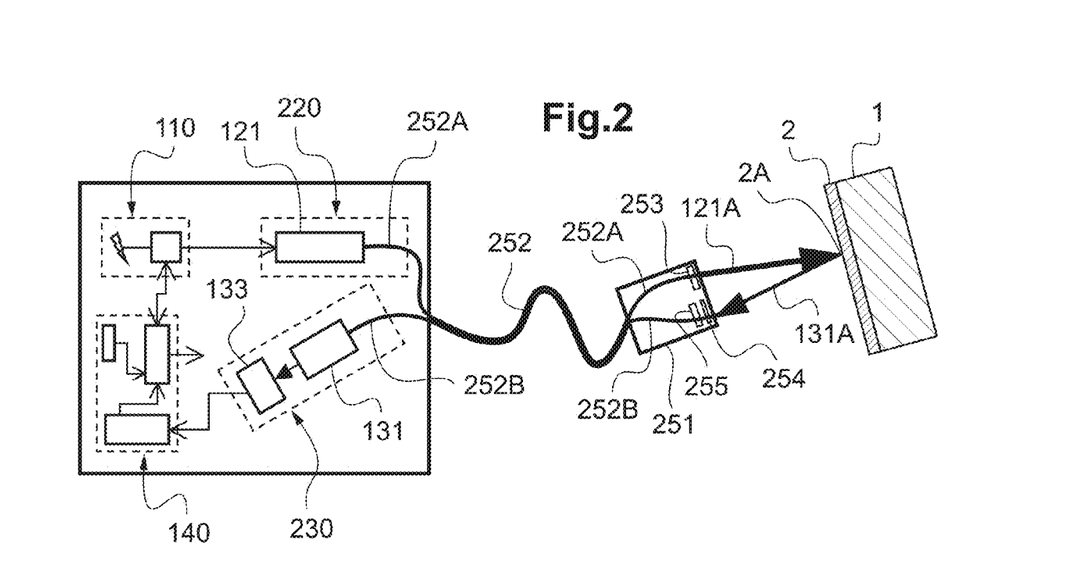
FIG. 2 is a diagrammatic view of a measurement device in a second embodiment.

In FIGS. 1 and 2, there can be seen two embodiments of a measurement device 100; 200 for measuring the thickness of a layer 2 of a material.

The two embodiments of the measurement device 100; 200 differ only in that the measurement device 200 includes a remote measurement head 251 (see FIG. 2) that enables thickness measurements to be performed closer to the layer 2 of material, while keeping the other elements of the measurement device 200 for measuring this layer 2 of material further away. It can be seen that this configuration is particularly advantageous for measuring the layer 2 of material while "hot".

In both embodiments shown in FIGS. 1 and 2, the layer 2 of material covers a substrate 1.

In a variant, it is possible to perform the method of the invention for measuring the thickness of a layer of material on its own, in the form of a thin plate or film. The terms "thin plate" or "thin film" are used herein to designate a plate or a film presenting a thickness that is much less than its length and its width.

In the example described in detail herein, the layer 2 of material is constituted by way of example by a layer of zinc that is deposited on a metal substrate 1 made of steel.

As shown in FIGS. 1 and 2, the measurement device 100; 200 also has emitter means 120; 220 electrically controlled by control means 110.

These electrical control means 110 deliver a control signal 111A.

The electrical control means 110 in this example comprise an electrical power supply 112 connected to a low frequency current generator 111 (see FIGS. 1 and 2). In this example, the low frequency current generator 111 is a low frequency sinewave voltage source and a current regulator that converts the sinusoidal voltage variations into current variations.

Thus, as a function of a frequency setpoint, the current generator 111 generates an electric current of magnitude, expressed in amps (symbol A), that is modulated over time.

More particularly in this example, the current generator 111 generates a current that is sinusoidal as a function of time $t$ at a modulation frequency $f_m$.

The sinusoidal current generated by the current generator 111 forms a control signal that is delivered by the electrical control means 110.

In general manner, this control signal, written below $i_{com}(t)$, can also be written in the following form:

$$i_{com}(t)=i_0*\cos(2*\pi*f_m*t+\phi_{com})$$

where $i_0$ and $\phi_{com}$ represent respectively the control amplitude expressed in amps (A), and the control phase expressed in radians (rad), of the control signal.

Figure 4:
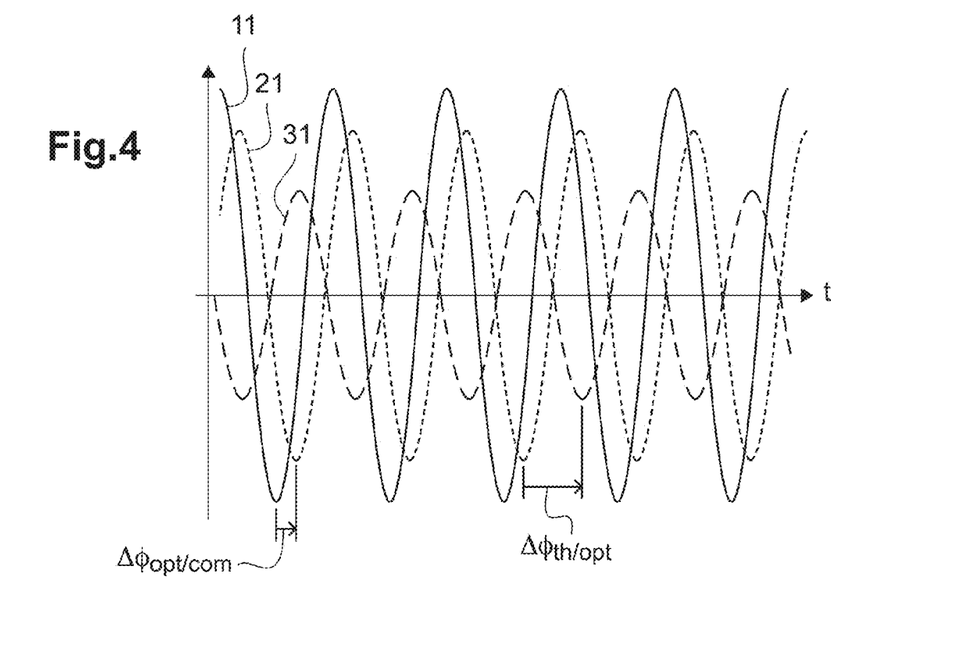
FIG. 4 plots curves showing the control signal, the modulated optical power, and the sinusoidal component of the radiated heat flux.

FIG. 4 shows an example of a curve 11 representative of the control signal as a function of time for a modulation frequency $f_m$ at 100 hertz (Hz), with a control amplitude equal to 1 A and a control phase $\phi_{com}$ equal to 0 rad.

The emitter means 120; 220 comprise a light source 121, in this example, a laser diode.

The laser diode used in this example is a diode that emits light at an emission wavelength $\lambda_L$ equal to 1064 nanometers (nm) and that presents maximum optical power $P_{max}$ equal to 20 watts (W).

In a variant, the light source of the emitter means may be constituted by way of example by a laser, such as a gas laser, a solid laser, or a doped fiber laser.

Under the control of the control means 110, the laser diode emits a light beam 121A at the emission wavelength $\lambda_L$.

Advantageously, the emission wavelength $\lambda_L$ is selected as a function of the nature of the material constituting the layer 2 so that the light beam 121A from the light source 121 is best absorbed by the layer 2 in order to heat it in optimum manner.

In the two embodiments shown in FIGS. 1 and 2, the laser diode is current controlled directly by the current generator 111, which delivers the control signal 111A.

Controlled in this way, the light beam 121A as emitted by the laser diode presents optical power $P_{opt}(t)$, expressed in watts (W) that is sinusoidally modulated as a function of time t at the modulation frequency $f_m$ of the control signal 111A.

In general, the optical power $P_{opt}(t)$ of the light beam 121A emitted by the light source 121 may be written in the following form:

$$P_{opt}(t)=P_0*\cos(2*\pi*f_m*t+\phi_{opt})$$

where $P_0$ and $\phi_{opt}$ represent respectively the maximum modulated optical power expressed in watts, and the phase of the light beam 121A expressed in radians (rad). This phase $\phi_{opt}$ of the light beam 121A is referred to below as the "optical phase".

In FIG. 4, the curve referenced 21 represents an example of the modulated optical power $P_{opt}(t)$ of the light beam 121A as a function of time t.

In FIG. 4, it can be seen that the curve 21 representative of the modulated optical power $P_{opt}(t)$ and the curve 11 representative of the control signal $i_{com}(t)$ present a time offset between each other at the modulation frequency $f_m$.

Below, the references 11 and 21 are used below to designate in general terms to designate respectively the control signal and the modulated optical power.

This time offset is due to the response time of the light source 121 that, under the electrical control of the current generator 111, does not respond instantaneously to the control signal 111A for emitting the light beam 121A.

In other words, the modulated optical power $P_{opt}(t)$ and the control signal $i_{com}(t)$ at the modulation frequency $f_m$ are phase shifted relative to each other: these two physical magnitudes present a phase shift $\Delta\phi_{opt/com}$ between each other.

This phase shift $\Delta\phi_{opt/com}$ is equal to the difference between the optical phase $\phi_{opt}$ of the modulated optical power 21 and the control phase $\phi_{com}$ of the control signal 11 (see FIG. 4), i.e.:

$$\Delta\phi_{opt/com}=\phi_{opt}-\phi_{com}$$

It can be seen from the description below that when a calibration phase shift $\Delta\phi_{cal}$ is determined at the modulation frequency $f_m$ during a calibration step of the measurement method of the invention, this calibration phase shift $\Delta\phi_{cal}$ is a function of the phase shift $\Delta\phi_{opt/com}$ between the modulated optical power $P_{opt}(t)$ of the light beam 121A and the control signal 11.

The emitter means 120, 220 are adapted to irradiate the layer 2 of material with the light beam 121A that is incident against the layer 2 at a heating point 2A (see FIGS. 1 and 2).

This has the effect of heating the layer 2 of material at the heating point 2A and around it, as a result of the light beam 121A being absorbed and the layer 2 being heated.

As a result of this heating, the temperature of the layer 2 at the heating point 2A varies, and the locally heated layer 2 then emits radiated heat flux 131A (see FIGS. 1 and 2) by heat radiation in all directions in three-dimensional space.

This radiated heat flux 131A, expressed in watts (W), is associated with the local temperature reached by the layer 2, and in particular at the heating point 2A.

In general manner, given the local temperature that is reached, the radiated heat flux 131A is emitted in the infrared range of wavelengths.

Since the optical power 21 of the light beam 121A is modulated, the fraction of the optical power that is absorbed by the layer 2 also varies in time, such that the localized heating of this layer 2 that the heating point 2A also oscillates as a function of time.

Consequently, the temperature of the layer 2 of material at the heating point 2A also presents oscillations in time.

Thus, the heat flux 131A radiated by the layer 2 varies as a function of time. By measuring the variation in this radiated heat flux 131A, the measurement device 100; 200 is capable of determining the thickness of the layer 2 of material.

To this end, and as shown for the embodiments of FIGS. 1 and 2, the measurement device 100, 200 includes detector means 130;230 adapted to detect the heat flux 131A radiated by the layer 2 as heated by the light beam 121A.

Specifically, in this example, the detector means 130; 230 comprise an infrared photothermal detector 131 for collecting the heat flux 131A radiated by the layer 2.

This photothermal detector 131 may for example be an infrared monodetector such as a lead selenide cell, a cooled charge-injection device (CID) type sensor made of indium antimonide, or a cooled mercury-cadmium telluride sensor.

The photothermal detector 131 generates an analog electrical signal 131B (see FIGS. 1 and 2) that is a function of the heat flux 131A radiated by the localized heating point 2A of the layer 2 irradiated by the light beam 121A.

The detector means 130; 230 also include an analog-to-digital converter 133 to which the analog signal 131B is applied.

This analog-to-digital converter 133 then delivers a measurement signal 133A (see FIGS. 1 and 2) that is a digital signal and that is representative of the heat flux 131A radiated by the layer 2.

As shown in FIGS. 1 and 2, the measurement device 100; 200 also includes an electronic and computer unit 140, referred to below by the acronym ECU.

This ECU 140 comprises firstly digital filter means 141 that receive as input the measurement signal 133A as digitized by the analog-to-digital converter 133 of the detector means 130; 230.

As explained above, the heat flux 131A radiated by the layer 2 presents oscillations associated with the variations in the temperature of the layer 2 of material absorbing the light beam 121A with optical power 21 that is modulated as a function of time (see FIG. 4).

FIG. 4 shows an example of a curve 31 representative of a sinusoidal component of the radiated heat flux 131A as a function of time.

The measurement signal 133A, which is a function of the heat flux 131A radiated by the layer 2, also includes a sinusoidal component that is modulated at the modulation frequency $f_m$.

This sinusoidal component of the measurement signal 133A is phase shifted relative to the curve 11 representative of the control signal. The term "measurement phase $\phi_{mes}$" is used to designate the phase of this sinusoidal component of the measurement signal 133A.

Since the measurement signal 133A is representative of the heat flux 131A radiated by the layer 2 of material detected by the photodetector 131, this measurement phase $\phi_{mes}$ is the sum of a "thermal" phase $\phi_{th}$ that corresponds to the sinusoidal component 31 of the radiated heat flux 131A plus an internal phase $\phi_{int}$ of the photodetector 131 and of the electronics of the acquisition chain, i.e.:

$$\phi_{mes} = \phi_{th} + \phi_{int}$$

Below, reference 31A is used to designate the sinusoidal component of the measurement signal 133A in general.

The digital filter means 141 of the ECU 140 are programmed to extract the sinusoidal component 31A from the measurement signal 133A and to determine the measurement phase $\phi_{mes}$ of this sinusoidal component 31A, at the modulation frequency $f_m$ of the control signal 11.

More precisely, the digital filter means 141 in this example perform the following conventional operations:
  i) calculating the Fourier transform of the measurement signal 133A; and
  ii) in the Fourier domain, extracting the sinusoidal component 31A of the measurement signal 133A by applying a bandpass filter that is very narrow and very selective, e.g. having a width of 10 Hz around the modulation frequency $f_m$.

In a variant, the measurement phase may be determined by acting, after above operation ii), to calculate the inverse Fourier transform of the Fourier transform of the filtered measurement signal, and then by determining the measurement phase directly by comparing it with the control signal 11.

In another variant, the digital filter means calculate the cross-correlation, also known as the cross-covariance, between the measurement and the control signal, thereby making it possible in the Fourier domain to extract a similarity peak between these two signals. This similarity peak is expressed as a complex number, and its argument is the phase shift between the two signals.

The ECU 140 also has calculation means 142 that separate the real portion and the imaginary portion of the sinusoidal component 31A in order to determine the measurement phase $\phi_{mes}$.

More precisely, the calculation means 142 separate the real portion and the imaginary portion of the inverse Fourier transform of the Fourier transform of the sinusoidal component 31A of the measurement signal 133A, given that the last-mentioned Fourier transform is a complex function.

Thereafter, the calculation means 142 act, for the modulation frequency $f_m$ of the control signal 11, to calculate a phase shift $\Delta\phi_{th/opt}$ between the sinusoidal component 31 of the radiated heat flux 131A and the modulated optical power 21 of the light beam 121A.

For this purpose, the calculation means 142 are connected:
  to the digital filter means 141 that transmit to the calculation means 142 the measurement phase $\phi_{mes}$ as obtained after digitally filtering the measurement signal 133A;
  to the current generator 111 that transmits the control phase $\phi_{com}$ of the control signal 11 to the calculation means 141 via the link 111B; and
  to memory means 143 that have previously recorded therein the calibration phase shift $\Delta\phi_{cal}$ as determined at the modulation frequency $f_m$ during the calibration step of the measurement method of the invention.

The calculation means 142 are programmed to calculate the phase shift $\Delta\phi_{th/opt}$ between the sinusoidal component 31 of the radiated heat flux 131A and the modulated optical power 21 of the light beam 121A, from:
  a measurement phase shift $\Delta\phi_{mes}$ between the measurement phase shift $\phi_{mes}$ and the control phase $\phi_{com}$, measurement phase shift $\Delta\phi_{mes}$ thus being such that:

$$\Delta\phi_{mes} = \phi_{mes} - \phi_{com}$$

and the calibration phase shift $\Delta\phi_{cal}$ as previously stored in the memory means 143.

The calculation means 142 are also programmed to determine the thickness of the layer 2 of material as a function of the phase shift $\Delta\phi_{th/opt}$ between the sinusoidal component 31 of the heat flux 131A radiated by the layer 2 of material and the modulated optical power 21 of the light beam 121A.

The description below explains how these measurement means are used in the measurement method of the invention for the purpose of performing this determination.

In both embodiments of the measurement device 100; 200 shown in FIGS. 1 and 2, the ECU 140 may also control the control means 110 via the link 111B in order to adjust the modulation frequency $f_m$ of the current generator 111.

In the first embodiment shown in FIG. 1, the emitter means 120 of the measurement device 100 include optical collimator means 122 for collimating the light beam 121A as it leaves the light source 121.

The light beam 121A emitted by the laser diode presents a large aperture angle, e.g. lying in the range 10° to 40°.

The optical collimator means 122 in this example are formed by a doublet lens corrected for optical aberrations in the emission wavelength range of the laser diode.

In a variant, the optical collimator means may comprise an aspherical lens, for example.

By inserting optical collimator means 122 on the path of the light beam 121A, the beam is caused to present angular divergence that is smaller, typically less than 5°.

Thus, the light beam 121A is finer, i.e. its radius $r_0$ at 1/e, expressed in meters (m) or millimeters (mm), is small, e.g. lying in the range 0.5 mm to 3 mm.

In this way, the quantity of energy deposited per unit area by the light beam 121A and absorbed by the layer 2 of material is greater, and the temperature rise at the localized heating point is greater.

In this first embodiment (see FIG. 1), the photothermal detector means 130 also comprise an optical filter 135 and optical collector means 132 placed between the layer 2 of material and the photothermal detector 131, on the path of the radiated heat flux 131A.

The optical filter 135 is designed so as to present low light transmission at wavelengths close to the emission wavelength $\lambda_L$ of the light source 121.

By way of example, such an optical filter 135 may be a germanium filter, presenting optical density that is greater than or equal to 10, and preferably greater than or equal to 20.

This optical filter 135 serves to prevent the photothermal detector 131 being illuminated by the light beam 121B reflected on the surface of the layer 2 of material (see FIG. 1).

In contrast, the optical filter 135 presents high light transmission in the infrared range so as to transmit a large fraction of the radiated heat flux 131A to the photothermal detector 131.

After being transmitted through the optical filter 135, the radiated heat flux 131A is collected by the optical collection means 132 that focus this radiated heat flux 131A on the photothermal detector 131 of the detector means (see FIG. 1), which can then detect the radiated heat flux 131A.

In the second embodiment shown in FIG. 2, the measurement device 200 also includes a remote measurement head 251 that is connected to the emitter means 220 and to the photothermal detector means 230 by a bundle 252 of optical fibers.

This bundle 252 of optical fibers comprises a first optical fiber 252A and a second optical fiber 252B.

The first optical fiber 252A is connected to the outlet from the laser diode so that the light beam 121A emitted by the laser diode is coupled to the inside of the first optical fiber 252A in order to be transported to the remote measurement head 251 (see FIG. 2).

The first optical fiber 252A includes an optical fiber focusing system 253 at that one of its ends that is situated towards the remote measurement head 251, serving to focus the light beam 121A at the outlet from the remote measurement head 251.

The remote measurement head 251 also has an optical filter 254 and an optical fiber collection system 255 so as to filter and focus the heat flux 131A radiated by the layer 2 into the second optical fiber 252B, coupling it of one of the ends of the fiber that is situated towards the remote measurement head 251 (see FIG. 2).

Configured in this way, the remote measurement head 251 uses the first optical fiber 252A to convey the light beam 121A emitted by the light source 121 and to collect the heat flux 131A radiated by the layer 2 of material heated by being irradiated by the light beam 121A.

This radiated heat flux 131A is then transported by means of the second optical fiber 252B to the photothermal detector 131 of the photothermal detector means 230, with the other end of the second optical fiber 252B being situated close to the photothermal detector 131 and being connected to the inlet of the photothermal detector 131.

In this way, the photothermal detector means 230 detect the heat flux 131A radiated by the layer 2 and deliver the measurement signal 133A that is representative of this radiated heat flux 131A.

Because of the presence of the remote measurement head 251 that is connected to the emitter means 220 and to the detector means 230 by the bundles 252 of optical fibers, the emitter means 220 and the detector means 230 can be arranged remotely from the layer 2 of material of thickness that is to be determined.

As described in greater detail below, this is particularly advantageous when this layer 2 of material presents a temperature that is very high, which might degrade the emitter means 220 and/or the detector means 230.

By using optical fibers of considerable length, e.g. of length greater than 5 m or 10 m, the laser diode constituting the light source 121 is thus kept away in particular from the layer 2 of material, thereby avoiding deteriorating the laser diode. This also provides better stability for the laser diode in terms of power and of wavelength.

It is also possible to envisage keeping only the emitter means or only the detector means in a remote location by using an optical fiber.

In a variant, the photothermal detector may be placed in the remote measurement head in order to collect the radiated light flux directly and to transmit it to the photothermal detector means via the optical fiber connecting the remote measurement head to the photothermal detector means.

Figure 3:
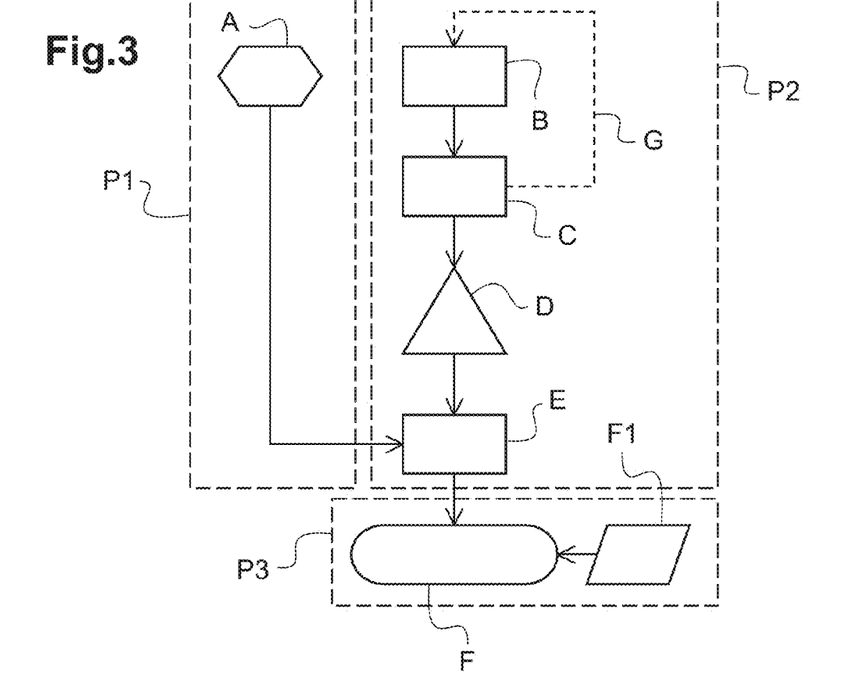
FIG. 3 is a flow chart showing the measurement method of the invention.

With reference to FIG. 3, there follows a description of the method of the invention for measuring the thickness of the layer 2 of material, which method uses one or the other of the measurement devices 100; 200 of FIGS. 1 and 2.

In the presently-described example, a set of twenty-two modulation frequencies is used, which frequencies are referenced respectively $f_{m,1}$, $f_{m,2}$, . . . up to $f_{m,22}$, these modulation frequencies $f_{m,1}$, $f_{m,2}$, . . . , $f_{m,22}$ all being different from one another.

In this particular embodiment, the measurement method comprises three successive periods in this example:

a first period P1 (see FIG. 3) that comprises calibrating (block A of FIG. 3) the emitter means 120; 220 relative to the control means 110 at each of the modulation frequencies $f_{m,1}$, $f_{m,2}$, . . . , $f_{m,22}$ in use;

a second period P2 (see FIG. 3), that comprises the following steps for each modulation frequency $f_{m,1}$, $f_{m,2}$, . . . , $f_{m,22}$:

a step (block B of FIG. 3) of heating the layer 2 by means of the light beam 121A;

a step (block C of FIG. 3) of detecting the radiated heat flux 131A by using the photothermal detector 131;

a step (block D of FIG. 3) of digitally filtering the measurement signal 133A by using the ECU 140; and a step (block E of FIG. 3) of using the ECU 140 to calculate the measurement phase shift $\Delta\phi_{nes}$; and a third period P3 (see FIG. 3) that comprises determining (block F of FIG. 3) the thickness of the layer 2 of material by using the ECU 140.

These various stages are described below.

First Period P1

During this first period P1, a calibration step (see block of FIG. 3) is performed at each modulation frequency $f_{m,1}$, $f_{m,2}$, . . . , $f_{m,22}$ in which the emitter means 120, 220 are calibrated in order to determine the calibration phase shifts $\Delta\phi_{cal,1}$, $\Delta\phi_{cal,2}$, . . . , $\Delta\phi_{cal,22}$ between the modulated optical power 21 and the control signal 11 (see FIG. 4), with this being done by using the photothermal detector means 130; 230 at the modulation frequencies $f_{m,1}$, $f_{m,2}$, . . . , $f_{m,22}$ under consideration.

This calibration step may be performed simply with the measurement devices 100; 200 shown in FIGS. 1 and 2 by using a plane mirror that is positioned and oriented so as to take the place of the layer 2 and of the substrate 1, while taking care to remove the optical filter 135, 254 so as to enable the photothermal detector means 130; 230 to measure the light beam 121B as reflected by the mirror.

In this configuration, the measurement signal 133A delivered by the detector means 130; 230 is sinusoidal and there is no need for any digital filtering of the measurement signal 133A. At each modulation frequency $f_{m,1}$, $f_{m,2}$, . . . $f_{m,22}$, the ECU 140 then determines the calibration phase shift $\Delta\phi_{cal,1}$, $\Delta \phi_{cal,2}, \ldots, \Delta \phi_{cal,22}$ between the laser diode and the current generator 111, and it stores these phase shifts in the memory means 143 of the ECU 140.

This calibration phase shift $\Delta \phi_{cal}$, as measured using the photodetector 131, is a function of the phase shift $\Delta \phi_{opt/com}$ between the modulated optical power 21 and the control signal 11. In this example, and more precisely, the calibration phase shift $\Delta \phi_{cal}$ includes systematic bias associated with the internal phase $\phi_{int}$ of the photodetector 131, such that the calibration phase shift $\Delta \phi_{cal}$ is the sum of the phase shift $\Delta \phi_{opt/com}$ plus the internal phase $\phi_{int}$ of the photodetector 131 and of the electronics of the acquisition chain. The following relationships thus apply:

$$\Delta \phi_{cal} = \Delta \phi_{opt/com} + \phi_{int}$$
$$= (\phi_{opt} - \phi_{com}) + \phi_{int}$$
$$= (\phi_{opt} + \phi_{int}) - \phi_{com}$$

At the end of the first measurement period P1, the various calibration phase shifts $\Delta \phi_{cal,1}, \Delta \phi_{cal,2}, \ldots, \Delta \phi_{cal,22}$ as determined respectively for all of the twenty-two modulation frequencies $f_{m,1}, f_{m,2}, \ldots, f_{m,22}$ are determined and stored in the memory means 143 of the ECU 140.

This first period is preferably performed prior to the second and third periods P2 and P3.

Second Period P2

The second period P2 of the measurement method begins with a step (block B of FIG. 3) of heating the layer 2 of material by irradiating the layer 2 with the light beam 121A coming from the emitter means 120; 220 of the measurement device 100; 200 (see FIGS. 1 and 2).

By way of example, a first heating step may be performed at a first modulation frequency $f_{m,1}$.

There follows a first detection step (block C of FIG. 3) in which the photothermal detector means 130; 230 are used to detect the heat flux 131A radiated by the layer 2 heated by the light beam 121A of optical power 21 that is thus modulated sinusoidally at the first modulation frequency $f_{m,1}$.

The radiated heat flux 131A is collected by the photothermal detector 131, and the detector means 130; 230 then deliver a first measurement signal 133A that is representative of the heat flux 131A radiated by the layer 2 of material.

During a first digital filtering step (block C of FIG. 3), this first measurement signal 133A is then digitally filtered by the digital filter means 141 of the ECU 140 in order to extract therefrom a first sinusoidal component 31A modulated at the first modulation frequency $f_{m,1}$.

This first sinusoidal component 31A is then transmitted to the calculation means 142 of the ECU 140, which then determine a first measurement phase $\phi_{mes,1}$ of this first sinusoidal component 31A.

Finally, during a first calculation step (block E of FIG. 3), the calculation means 142 calculate, for the first modulation frequency $f_{m,1}$, a first phase shift $\Delta \phi_{th/opt,1}$ between the first sinusoidal component 31A of the radiated heat flux 131A and the modulated optical power 21 of the light beam 121A.

This first phase shift $\Delta \phi_{th/opt,1}$ is calculated from the first measurement phase shift $\Delta \phi_{mes,1}$ between the first measurement phase $\phi_{mes,1}$ of the first sinusoidal component 31A and the first control phase $\phi_{com,1}$ of the control signal 11, and the first calibration phase shift $\Delta \phi_{cal,1}$ as previously determined during the first calibration step of the first period P1 (see continuous line arrow between block A and block E in FIG. 3).

In particular, the following relationships apply:

$$\Delta \phi_{th/opt,1} = \Delta \phi_{mes,1} - \Delta \phi_{cal,1}$$

with $$\Delta \phi_{mes,1} = \phi_{mes} - \phi_{com} \text{ and } \Delta \phi_{cal,1} = (\phi_{opt} + \phi_{int}) - \phi_{com}$$

thus $$\Delta \phi_{th/opt,1} = (\phi_{mes} - \phi_{com}) - [(\phi_{opt} + \phi_{int}) - \phi_{com}]$$

i.e.:

$$\Delta \phi_{th/opt,1} = [(\phi_{th} + \phi_{int}) - \phi_{com}] - [(\phi_{opt} + \phi_{int}) - \phi_{com}]$$

which may be written:

$$\Delta \phi_{th/opt,1} = (\phi_{th} + \phi_{int}) - (\phi_{opt} + \phi_{int}).$$

Which ends up giving:

$$\Delta \phi_{th/opt,1} = \phi_{th} - \phi_{opt}$$

Thus, by using the photothermal detector means 130; 230 both for the calibration step and for the detection step, it is possible, regardless of the modulation frequency $f_m$ of the control signal 11, to be insensitive to the internal phase of the photothermal detector 131, and thereby to obtain, by using the measurement method of the invention, a very accurate measurement of the phase shift $\Delta \phi_{th/opt}$ between the radiated heat flux 131A and the light beam 121A.

In the presently-described example of the measurement method, twenty-two modulation frequencies are used.

Nevertheless, the measurement method of the invention may be performed while using a single modulation frequency for the control signal, or while using any other number of modulation frequencies greater than or equal to one.

The accuracy of the measurement method is improved when a plurality of modulation frequencies are used.

It is preferable to use at least five modulation frequencies. More preferably, more than ten modulation frequencies are used.

In the second period P2, the calibration, heating, and detection steps are performed for each of the other modulation frequencies $f_{m,2}, \ldots, f_{m,22}$.

During the other calculation steps, for these other modulation frequencies f other phase shifts $\Delta \phi_{th/opt,2}, \ldots, \Delta \phi_{th/opt,22}$ are likewise calculated between the other sinusoidal component at the other modulation frequencies $f_{m,2}, \ldots, f_{m,22}$ of the radiated heat flux 131A and the modulated optical power 21 of the light beam 121A at these other modulation frequencies $f_{m,2}, \ldots, f_{m,22}$.

In advantageous manner, for two particular modulation frequencies that are used in succession, $f_m$ and $f'_m$, the heating step (block B of FIG. 3) and the detection step (block C of FIG. 3) performed for the modulation frequency $f'_m$ used second are performed in parallel with the digital filtering step (block D of FIG. 3) and with the calculation step (block E of FIG. 3) performed for the modulation frequency $f_m$ used immediately beforehand (see arrow G in dashed lines between block C and block D of FIG. 3).

In this way, the duration of the second period P2 is shortened, and all of the phase shifts $\Delta \phi_{th/opt,1}, \Delta \phi_{th/opt,2}, \ldots, \Delta \phi_{th/opt,22}$ are obtained more quickly as calculated for each of the modulation frequencies $f_{m,1}, f_{m,2}, \ldots, f_{m,22}$.

Thus, at the end of the second period P2, a set of measured experimental phase shift values $\Delta\phi_{th/opt,1}$, $\Delta\phi_{th/opt,2}$, ..., $\Delta\phi_{th/opt,22}$ is available for the various modulation frequencies $f_{m,1}$, $f_{m,2}$, ..., $f_{m,22}$ between the sinusoidal component 31 of the radiated heat flux 131A and the modulated optical power 21 of the light beam 121A.

Third Period P3

During the third period P3, a step (block F of FIG. 3) is performed of determining the thickness of the layer 2 of material as a function of the phase shifts $\Delta\phi_{th/opt,1}$, $\Delta\phi_{th/opt,2}$, ..., $\Delta\phi_{th/opt,22}$ calculated for each of the modulation frequencies $f_{m,1}$, $f_{m,2}$, ..., $f_{m,22}$ between the sinusoidal component 31 of the heat flux 131A radiated by the layer 2 and the modulated optical power 21 of the light beam 121A.

For this purpose, it is possible to perform statistical regression on the measured experimental phase shift values $\Delta\phi_{th/opt,1}$, $\Delta\phi_{th/opt,2}$, ..., $\Delta\phi_{th/opt,22}$.

More precisely, curve-fitting is performed by comparing the experimental phase shift values $\Delta\phi_{th/opt,1}$, $\Delta\phi_{th/opt,2}$, ..., $\Delta\phi_{th/opt,22}$ as calculated during the second period P2 with theoretical values obtained from a theoretical curve representative of the theoretical phase shift $\Delta\phi_{th/opt,theo}$ between the sinusoidal component 31 and the modulated optical power 21 as a function of the modulation frequency.

It is shown that at a particular modulation frequency $f_m$, the theoretical phase shift $\Delta\phi_{th/opt,theo}$ is expressed as a function of the thickness $\underline{d}$ of the layer 2 of material, e.g. by the following mathematical relationship (relationship R1):

$$\Delta\phi_{th/opt}(f_m) = \arg\left( \int_0^{+\infty} \frac{\frac{1}{2}x \times \exp\left(-\frac{x^2}{4}\right)}{\kappa_1^2 - \alpha_c^2} \times \left\{ \frac{e^{-\kappa_1 d}}{\kappa_1 D}\left[(e^{-\alpha_c d} - e^{-\kappa_1 d})(1 + k_s\kappa_2 R_{cont}) + \left(e^{-\kappa_1 d} - \frac{\kappa_1}{\alpha_c}e^{-\alpha_c d}\right)\frac{k_s\kappa_2}{k_c\kappa_1}\right] + \left(1 - \frac{\alpha_c}{\kappa_1}\right)\right\} dx \right)$$

where:

$$D = (1 + e^{-2\kappa_1 d})\frac{k_s\kappa_2}{k_c\kappa_1} + (1 - k_s\kappa_2 R_{cont})$$

and:

$$\kappa_1 = \sqrt{x^2/r_0^2 - 2\pi i f_m \rho_c C_c / k_c} \quad \text{and} \quad \kappa_2 = \sqrt{x^2/r_0^2 - 2\pi i f_m \rho_s C_s / k_s}$$

The above formula makes use of various physical constants that depend on materials, and it also makes use of geometrical parameters. In particular:

$\rho_c C_c$ and $\rho_s C_s$ are respectively the heat capacities per unit volume, expressed in joules per kelvin and per cubic meter ($J \cdot K^{-1} \cdot m^3$), of the layer 2 and of the substrate 1;

$k_c$ and $k_s$ are respectively the thermal conductivities, expressed in watts per meter and per kelvin ($W \cdot M^{-1} \cdot K^{-1}$), of the layer 2 and of the substrate 1;

$\underline{d}$ is the thickness, expressed in meters (m), of the layer 2 of material;

$r_0$ is the radius at 1/e, expressed in meters, of the laser light beam 121A (where $\underline{e}$ is a constant equal to $e_1 = \exp(1)$, where exp is the exponential function);

$R_{cont}$ is the thermal resistance, expressed in square meter kelvins per watt ($m^2 \cdot K \cdot W^{-1}$), at the interface between the layer 2 and the substrate 1; and $\alpha_c$ is the absorption coefficient per meter ($m^{-1}$) of the layer 2 of material at the emission wavelength $\lambda_L$ of the light beam 121A emitted by the light source 121.

Thus, the curve representing the theoretical phase shift $\Delta\phi_{th/opt,theo}$ depends firstly on the thickness $\underline{d}$ of the layer 2 of material, and secondly on these physical constants (block F1 of FIG. 3), where the thickness $\underline{d}$ and these physical constants are taken as adjustment parameters for the curve fitting.

In other words, during the determination step (block F of FIG. 3), the curve representative of the theoretical phase shift $\Delta\phi_{th/opt,theo}$ between the modulated optical power 21 and the sinusoidal component 31 as a function of the modulation frequency is fitted as a function of these adjustment parameters, while taking account of said phase shifts $\Delta\phi_{th/opt}$, $\Delta\phi'_{th/opt}$ as calculated for said modulation frequencies $f_m$, $f'_m$ in question, so that the curve representative of the theoretical phase shift $\Delta\phi_{th/opt,theo}$ describes as well as possible the experimental phase shift values $\Delta\phi_{th/opt,1}$, $\Delta\phi_{th/opt,2}$, ..., $\Delta\phi_{th/opt,22}$ that have been determined.

By way of example, such regression may be performed using the Levenberg-Marquardt algorithm.

Figure 5:
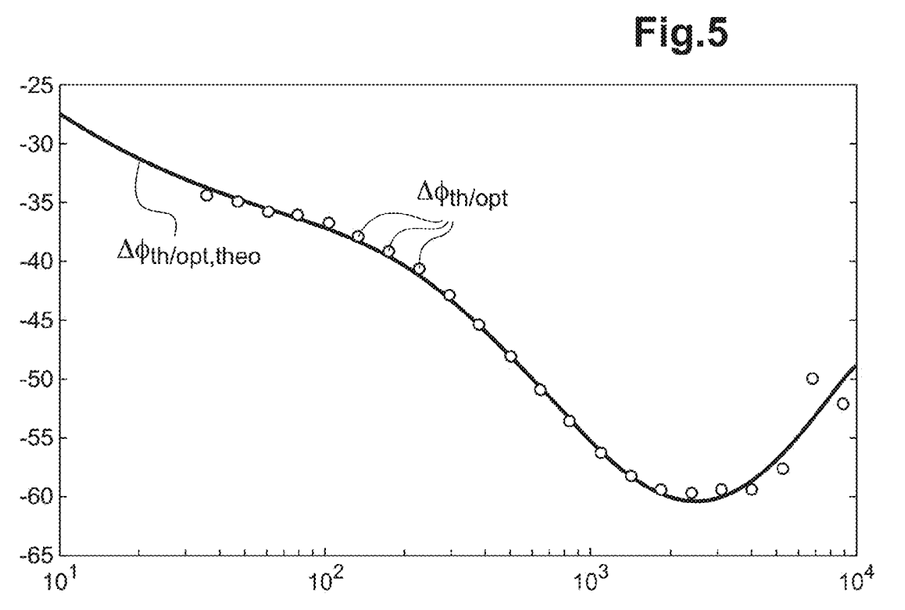
FIG. 5 shows a theoretical curve for the phase shift between the sinusoidal component of the radiated heat flux and the modulated optical power of the light beam as a function of the modulation frequency, and as obtained after adjusting the measurement parameters.

This fitting is shown in FIG. 5, in which:

the modulation frequency $f_m$, expressed in hertz (Hz) is plotted on a logarithmic scale along the abscissa axis; and the phase shift between the sinusoidal component 31 of the radiated heat flux 131A and the modulated optical power 21 of the light beam 121A is plotted up the ordinate axis.

In FIG. 5, there can be seen:

the twenty-two experimental values for the phase shift $\Delta\phi_{th/opt}$ as calculated during the second period P2; and the theoretical phase shift curve $\Delta\phi_{th/opt,theo}$ between the sinusoidal component 31 of the radiated heat flux 131A and the modulated optical power 21 of the light beam 121A as a function of the modulation frequency obtained by using the inverse method of the Levenberg-Marquardt type.

This curve, which is the best fit in the Levenberg-Marquardt meaning, is obtained for a set of adjustment parameters.

The thickness $\underline{d}$ of the layer 2 of material is then determined as being one of these adjustment parameters for this representative best-fit theoretical curve.

In a variant, the measurement method is performed using a single modulation frequency for the control signal.

The thickness of the layer 2 of material is determined as a function of the phase shift $\Delta\phi_{th/opt}$ between the sinusoidal component of the radiated heat flux 131A and the modulated optical power 21 of the light beam by using the same relationship R1 as above.

In this relationship, predetermined values are then given to the various thermo-physical magnitudes, which values are predetermined as a function of the nature of the material of the layer 2, of the nature of the substrate 1, and of the experimental conditions, such as temperature, for example.

During this process, it is possible to set a range of possible values for the various thermo-physical magnitudes.

The measurement device and the measurement method of the invention find a particularly advantageous application in measuring the thickness of a layer deposited on a metal substrate by galvanization, generally while hot, e.g. for the purpose of protecting the metal substrate against corrosion.

Under such circumstances, the layer 2 is mostly constituted by zinc, having a zinc content lying in the range 75% to 100% by weight of zinc.

The invention thus also provides a galvanization method comprising:
preparing a deposition surface on the metal substrate 1;
initially immersing the metal substrate 1 in a bath of molten zinc, the zinc then being at a temperature lying in the range 420° C. to 480° C.;
extracting the metal substrate 1 from the bath of molten zinc, the metal substrate 1 then being covered in a layer 2 of zinc; and
determining the thickness $\underline{d}$ of said layer 2 of zinc deposited on said metal substrate 1 by using a measurement method as described above.

Such a galvanizing method serves to deposit layers of zinc having thicknesses that generally lie in the range 1 micrometer ($\mu$m) to 1 millimeter (mm), depending on the duration of immersion, on the type of steel used, and on the temperature of the bath of molten zinc.

During the step of preparing the substrate 1, it is subjected to degreasing, cleaning, and fluxing, which is an operation for preventing re-oxidization of the substrate 1.

The metal substrate 1 is immersed in the bath of molten zinc for an immersion time of several minutes, e.g. lying in the range 5 minutes (min) to 10 min, as a function of the nature of the steel and of the desired thickness of zinc.

The steps of immersing the metal substrate 1 in the bath and of extracting it may be performed by dipping or continuously. For dipping, the substrate 1 that is to be covered in zinc is inserted into the bath of molten zinc, is left stationary in the bath for the dipping time, and is then extracted from the bath. For continuous galvanization, a strip of steel is unwound through the bath of zinc in uninterrupted manner at a certain speed, and it is rewound on leaving the bath.

In particularly advantageous manner, the method and the device of the invention make it possible to perform the determination step on leaving the bath, while the layer 2 of zinc presents a temperature lying in the range 150° C. to 480° C.

The thickness of the layer 2 of zinc deposited on the substrate 1 is thus verified very quickly, while hot, without waiting for the layer 2 of zinc and its substrate 1 to cool down, which might require an entire day.

The second embodiment of the device 200 is then particularly advantageous, since the remote measurement head 251, which is at a distance from the light source 121 and the detector means 230, makes it possible to avoid the disturbances and/or degradations that might be involved as a result of these elements being close to the layer 2 of zinc at high temperature.

In practice, the thickness of the layer 2 of zinc can be measured at a time lying in the range 0.1 seconds (s) to 15 min after the substrate 1 has been removed from the bath of molten zinc.

Advantageously, when the measured thickness of the layer 2 of zinc shows that this thickness is less than a desired threshold thickness of zinc on the substrate 1, it is then possible to re-immerse the substrate 1 in the bath of molten zinc in order to continue depositing zinc on the substrate 1.

In contrast, in the prior art, methods of measuring the thickness of the layer of zinc are performed after a long period of cooling, typically longer than one hour, which means that it is not possible to re-immerse the substrate in the bath of molten zinc. It is then necessary to clean the substrate by immersing it in a de-zincing bath in order to remove the layer of zinc that has already been deposited and to restart galvanization while leaving the substrate for a longer length of time in the bath of molten zinc in order to obtain the desired thickness for the layer of zinc.

That represents the drawback of being lengthy and expensive.

The galvanizing method of the invention thus enables thickness to be measured very quickly, and where necessary enables the thickness to be adjusted very quickly.

This is particularly advantageous when making a series comprising a large quantity of parts, since in a process of continuous improvement, measuring the initial parts makes it possible to improve compliance of subsequent parts.

By means of the galvanizing method of the invention, it is possible in real time to adapt the deposition characteristics for the layer 2 of zinc in order to obtain the desired thickness, e.g. to vary the length of time the substrate 1 is immersed in the bath, the temperature of the bath, the composition of the bath, the speed at which the substrate 1 covered in the layer 2 of zinc is extracted, or indeed, when performing continuous galvanization, the travel speed of the steel strip, and also adjusting the jets of compressed air that blow against opposite sides of the galvanized steel strip as it leaves the bath in order to remove the still-liquid surplus of zinc.

There is then no need to set deposition parameters for depositing the layer 2 of zinc in such a manner as to obtain a thickness that is much greater than the desired thickness, and it is thus possible to avoid operations of cleaning and re-immersing the substrate 1 in the bath.

The method of the invention is thus particularly inexpensive.

The above-described measurement method of the invention thus presents numerous advantages when it is performed at high temperature, higher than 150° C., as in the context of the above-described galvanizing method:
the signal-to-noise ratio is better than at ambient temperature;
infrared photothermal detectors are less expensive in the shorter wavelength bands that correspond to a high temperature radiated heat flux;
measurement is performed without making contact with the layer of material at high temperature, thus making it possible to avoid damaging the measurement device; and
using the second embodiment of the measurement device 200 enables the measurement head to be remote from the other portions of the measurement device in order to take measurements close to the substrate and the layer of material at high temperature, while preserving the light source and the photothermal detector from excessive infrared radiation.

The measurement method and the galvanizing method of the invention provide industry with savings in terms of cost and speed by:
reducing costs associated with removing zinc and galvanizing a second time in the event of non-compliance for galvanization by dipping;
reducing costs associated with potential feedback on the production chain;
reducing delivery times by treating non-compliant parts quickly, i.e. parts for which the measured thickness of the layer of zinc is less than the desired thickness threshold; and
greater ease of integration as a result of using a remote measurement head that withstands high temperatures.

The results of tests performed on four samples of galvanized steel having the following characteristics are listed below:

Sample No. 1: galvanized steel part having dimensions of 4 centimeters (cm)×6 cm with a layer of zinc having a thickness of about 45 µm;

Sample No. 2: a metalwork part having dimensions of 4 cm×6 cm, zinc thickness: about 55 µm;

Sample No. 3: a metalwork part having dimensions of 4 cm×6 cm, zinc thickness: about 60 µm;

Sample No. 4: a galvanized metalwork part having dimensions of 2.5 cm×5 cm, zinc thickness: about 170 µm.

For all four samples, the thickness of the layer of zinc was measured by using:

a prior art cold measurement method (method No. 1), using an eddy current magnetic feeler of the Dualscope MP-0 type manufactured by the supplier Helmut Fischer; and the measurement method of the invention (method No. 2) using the measurement device 20 of FIG. 2 with a remote measurement head 251 situated at a distance of 10 cm from the samples and spaced apart from the emitter means 220 and the detector means 230 by a distance of 2 m.

In order to be in "hot" conditions for the measurement method of the invention, the samples were bonded to a steel plate that was heated with a blow torch. The temperature of the samples was measured using a digital thermometer and the duration and the intensity of the heating of the steel plate were adjusted so that the samples were maintained at a temperature lying in the range 350° C. to 400° C. throughout the measurement of the thickness of the layer of zinc.

The table below gives the results of the measured thicknesses (in micrometers) for the various samples using the two methods, the cold method and the hot method.

|  | Theoretical thickness (µm) | Method No. 1 (prior art) | Method No. 2 (invention) |
|---|---|---|---|
| Sample No. 1 | 45 | 45.6 | 47.0 |
| Sample No. 2 | 55 | 56.2 | 55.9 |
| Sample No. 3 | 60 | 62.0 | 61.4 |
| Sample No. 4 | 170 | 164.9 | 163.5 |

It can be seen from the above table that the results obtained by both methods are entirely comparable, showing that the measurement method of the invention enables useful measurements to be taken on galvanized steel parts while hot and without contact.

The measurement is fast, and unlike the prior art, it can take place immediately the steel parts leave the galvanizing bath, thus making it possible in real time to correct the various parameters of the galvanizing method.

The invention claimed is:

1. A method of measuring the thickness (d) of a layer (2) of a material by using a light source (120; 220) for emitting a light beam (121A), the light source being electrically controlled by a sinusoidal control signal (11) having a modulation frequency $f_m$ and a control phase $\phi_{com}$, such that said light beam (121A) presents optical power (21) that is sinusoidally modulated at said modulation frequency $f_m$, said measurement method comprising the following successive steps:

a) a calibration step a) using photothermal detector means (130; 230), comprising an infrared photothermal detector (131), to determine a calibration phase shift $\Delta\phi_{cal}$ between said modulated optical power (21) and said control signal (11) for said modulation frequency $f_m$;

b) a heating step b) for heating said layer (2) of material by irradiating said layer (2) of material with said light beam (121A);

c) a detection step c) for detecting a sinusoidal component (31) of a heat flux (131A) radiated by said layer (2) of heated material, by using said photothermal detector means (130; 230) as used during said calibration step a), said photothermal detector means (130; 230) delivering a measurement signal (133A) that is representative of said radiated heat flux (131A);

d) a digital filtering step d) for filtering said measurement signal (133A) in order to:

extract a sinusoidal component (31A) from said measurement signal (133A) that is modulated at said modulation frequency fm of the control signal (11), and determine a measurement phase $\phi_{mes}$ of said sinusoidal component (31A) of said measurement signal (133A); and e) a calculation step e) for calculating, for said modulation frequency $f_m$ of the control signal (11), a phase shift $\Delta\phi_{th/opt}$ between said sinusoidal component (31) of the radiated heat flux (131A) and said modulated optical power (21) of the light beam (121A), while taking account:

said calibration phase shift $\Delta\phi_{cal}$ as previously determined during said calibration step a), and a measurement phase shift $\Delta_{\phi mes}$ between said sinusoidal component (31A) of the measurement signal (133A) and said control signal (11); and f) a determination step f) for determining the thickness (d) of said layer (2) of material as a function of said phase shift $\Delta\phi_{th/opt}$ between said sinusoidal component (31) of the radiated heat flux (131A) and said modulated optical power (21) of the light beam (121A).

2. A measurement method according to claim 1, wherein:

the steps a) to d) are repeated for another modulation frequency $f'_m$ of the control signal (11) that is different from said previously used modulation frequency $f_m$;

another phase shift $\Delta\phi'_{th/opt}$ between said sinusoidal component (31) at said other modulation frequency $f'_m$ of the radiated heat flux (131A) and said modulated optical power (21) of the light beam (121A) at said other modulation frequency $f'_m$ is also calculated prior to step f), for said other modulation frequency $f'_m$; and during the determination step f), the thickness (d) of said layer (2) of material is determined also as a function of said other calculated phase shift $\Delta\phi'_{th/opt}$.

3. A measurement method according to claim 2, wherein steps b) and c) are repeated for said other modulation frequency $f'_m$ of the control signal (11) are executed in parallel with steps d) and e) performed for said modulation frequency $f_m$ of the control signal (11).

4. A measurement method according to claim 3, wherein during the determination step e):

adjustment parameters are used to match a curve representative of a theoretical phase shift $\Delta\phi_{th/opt,theo}$ between said sinusoidal component (31) of the radiated heat flux (131A) and said modulated optical power (21) of the light beam (121A) as a function of the modulation frequency $f_m$ of the control signal (11), while taking account of the phase shifts $\Delta\phi_{th/opt}$ and $\Delta\phi'_{th/opt}$ as calculated for different modulation frequencies $f_m$ and $f'_m$; and the thickness (d) of said layer (2) of material is determined as being one of said adjustment parameters for the matched representative curve.

5. A galvanizing method for galvanizing a metal substrate (1), the method comprising the following successive steps:
preparing a deposition surface of said metal substrate (1);
immersing said metal substrate (1) in a bath of molten zinc;
extracting said metal substrate (1) from the bath of molten zinc, said deposition surface of the metal substrate (1) being covered in a layer (2) of zinc; and
determining the thickness (d) of said layer (2) of zinc deposited on said metal substrate (1) by using a measurement method according to claim 3.

6. A measurement method according to claim 2, wherein during the determination step e):
adjustment parameters are used to match a curve representative of a theoretical phase shift $\Delta\phi_{th/opt,theo}$ between said sinusoidal component (31) of the radiated heat flux (131A) and said modulated optical power (21) of the light beam (121A) as a function of the modulation frequency $f_m$ of the control signal (11), while taking account of the phase shifts $\Delta\phi_{th/opt}$ and $\Delta\phi'_{th/opt}$ as calculated for different modulation frequencies $f_m$ and $f'_m$; and
the thickness (d) of said layer (2) of material is determined as being one of said adjustment parameters for the matched representative curve.

7. A galvanizing method for galvanizing a metal substrate (1), the method comprising the following successive steps:
preparing a deposition surface of said metal substrate (1);
immersing said metal substrate (1) in a bath of molten zinc;
extracting said metal substrate (1) from the bath of molten zinc, said deposition surface of the metal substrate (1) being covered in a layer (2) of zinc; and
determining the thickness (d) of said layer (2) of zinc deposited on said metal substrate (1) by using a measurement method according to claim 6.

8. A galvanizing method for galvanizing a metal substrate (1), the method comprising the following successive steps:
preparing a deposition surface of said metal substrate (1);
immersing said metal substrate (1) in a bath of molten zinc;
extracting said metal substrate (1) from the bath of molten zinc, said deposition surface of the metal substrate (1) being covered in a layer (2) of zinc; and
determining the thickness (d) of said layer (2) of zinc deposited on said metal substrate (1) by using a measurement method according to claim 2.

9. A galvanizing method for galvanizing a metal substrate (1), the method comprising the following successive steps:
preparing a deposition surface of said metal substrate (1);
immersing said metal substrate (1) in a bath of molten zinc;
extracting said metal substrate (1) from the bath of molten zinc, said deposition surface of the metal substrate (1) being covered in a layer (2) of zinc; and
determining the thickness (d) of said layer (2) of zinc deposited on said metal substrate (1) by using a measurement method according to claim 1.

10. A galvanizing method according to claim 9, wherein the thickness (d) of said layer (2) of zinc is determined on exiting the bath, while said layer (2) of zinc presents a temperature lying in the range 150° C. to 480° C.

11. A galvanizing method according to claim 10, wherein the thickness (d) of said layer (2) of zinc as measured on exiting the bath is compared with a desired threshold thickness, and when said measured thickness is less than said threshold value, said metal substrate (1) is re-immersed in the bath of molten zinc.

12. A galvanizing method according to claim 10 for galvanizing a series of metal substrates, wherein the deposition parameters for depositing the layer (2) of zinc on one of said substrates of the series are adapted as a function of the thickness (d) of the layer (2) of zinc on at least one of the previously galvanized substrates, as measured on exiting the bath.

13. A galvanizing method according to claim 9 for galvanizing a series of metal substrates, wherein the deposition parameters for depositing the layer (2) of zinc on one of said substrates of the series are adapted as a function of the thickness (d) of the layer (2) of zinc on at least one of the previously galvanized substrates, as measured on exiting the bath.

* * * * *